United States Patent [19]

Albaugh

[11] 4,404,629
[45] Sep. 13, 1983

[54] DATA PROCESSING SYSTEM WITH LATCH FOR SHARING INSTRUCTION FIELDS

[75] Inventor: Michael E. Albaugh, San Jose, Calif.

[73] Assignee: Atari, Inc., Sunnyvale, Calif.

[21] Appl. No.: 228,441

[22] Filed: Jan. 26, 1981

[51] Int. Cl.³ .......................... G06F 9/28; G06F 9/26; G06F 9/42
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,878,514 | 4/1975 | Faber | 364/200 |
| 4,042,972 | 8/1977 | Gruner | 364/200 |
| 4,073,006 | 2/1978 | Tubbs | 364/200 |
| 4,075,707 | 2/1978 | Wilmer | 364/900 |
| 4,117,536 | 9/1978 | Bodner | 364/200 |
| 4,218,757 | 8/1980 | Drogichen | 364/900 |
| 4,253,142 | 2/1981 | Bavoux | 364/200 |
| 4,370,729 | 1/1983 | Bosch | 364/200 |

OTHER PUBLICATIONS

McDonald, J. F.; Sustman, J. E.; and Harris, R. G. "Fast Register-Transfer-Module Writable Control Store for Microprogrammed Computer Design." *Proceedings of the IEEE*, vol. 61, No. 11 (Nov. 1973) pp. 1538-1543.

Mick, J. R. "Microprogramming for the Hardware Engineer." *8080 Wescon Technical Papers*, vol. 20 (1976) 20, pp. 1-9.

*Primary Examiner*—James D. Thomas
*Assistant Examiner*—James T. Beran
*Attorney, Agent, or Firm*—Townsend and Townsend

[57] ABSTRACT

A microprocessor, having a memory element containing a plurality of multi-bit instruction words, an arithmetic logic (ALU) unit coupled to the memory element and responsive to at least a portion of each of the instruction words for performing data manipulations, and a controller for generating address signals that are communicated to the memory element to cause sequential access of the instruction words, includes a storage element that interconnects certain of the signal lines that communicate the instruction words to the ALU to the controller. In response to a first predetermined instruction word the storage element receives and stores the portion of the instruction word being conducted to the ALU. In response to a second predetermined instruction word, the content of the storage element is transferred to the controller to form an address signal.

6 Claims, 1 Drawing Figure

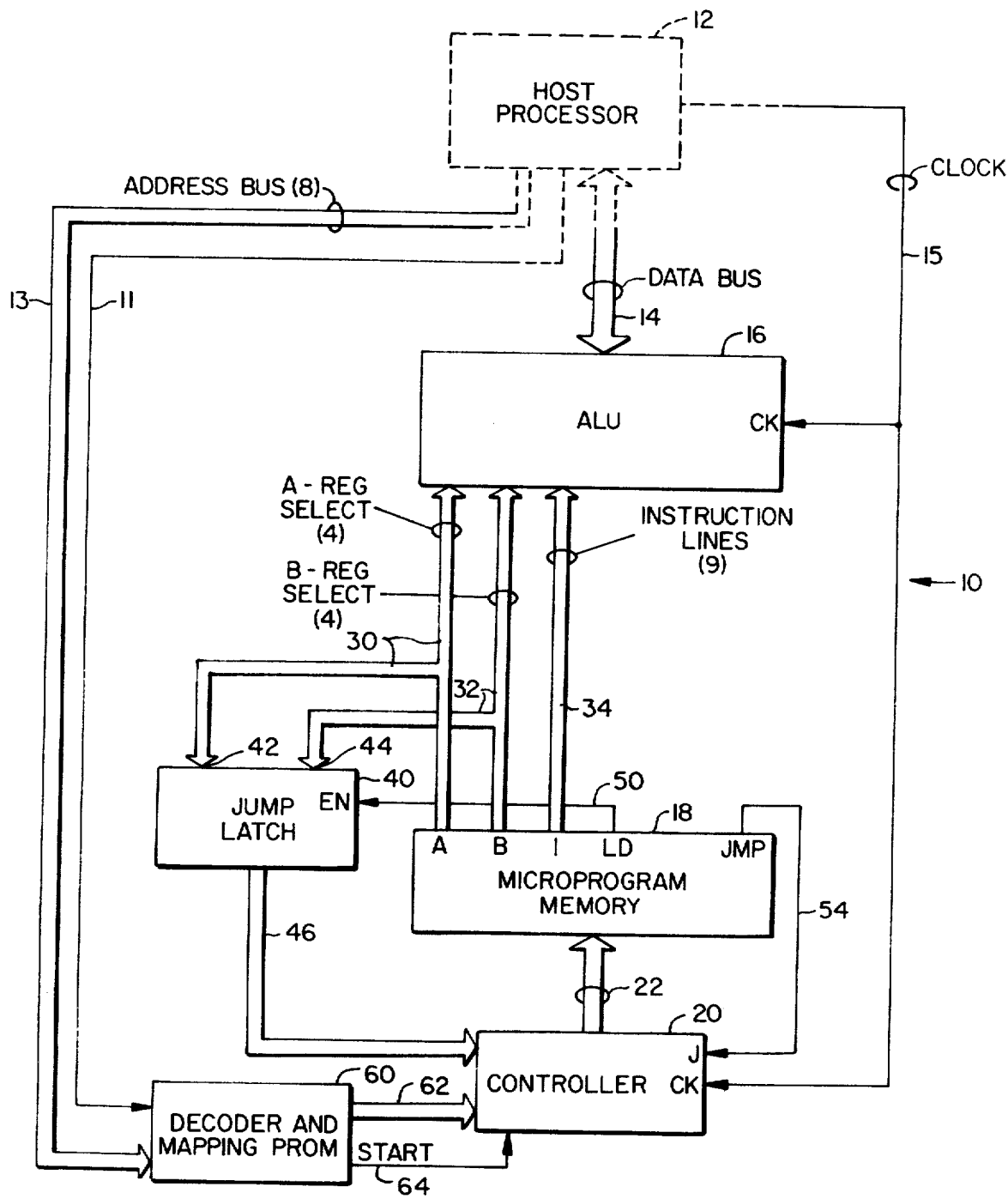
FIG._1.

DATA PROCESSING SYSTEM WITH LATCH FOR SHARING INSTRUCTION FIELDS

The present invention relates generally to microprocessor systems and more particularly to apparatus for allowing shared and simultaneous use of microinstruction bit fields used to control an arithmetic logic unit of the microprocessor to also supply addresses used to access microinstructions from a memory unit.

BACKGROUND OF THE INVENTION

Many of today's microprocessor systems use a read-only-memory (ROM) containing a plurality of multi-bit instruction words, called microinstructions, which are accessed to effect control of the microprocessor. Typically, the microprocessor system includes a controller element which forms address signals that are used to access the microinstructions from the ROM. Each microinstruction accessed contains bits to control the microprocessor hardware, including an arithmetic logic unit (ALU) to perform the necessary shifting and manipulation of data as required for the data processing operations.

The architecture of the microprogram memory determines, to a large extent, the operating capabilities of the microprocessor. For example, microprogram memories that store 8-bit microinstructions will operate more slowly than those which store microinstructions of larger bit numbers due to the need to fetch more microinstructions to perform a particular operation. Thus, if speed of operation must be considered when designing a microprocessor system, a ROM structured to contain wide, multi-bit microinstructions (e.g. 16 bits or greater) is one solution. Such many-bit microinstructions provide that capability of performing several functions simultaneously such as, for example, selecting registers contained in the ALU as the source/destination of data, specifying an ALU operation, and designating a next microinstruction address. However, this can increase the cost of the microprocessor system in terms of requiring larger ROM capacity and additional interconnecting signal lines within the system. Further, unless such predetermined bit fields are used extensively, they become a luxury that the designer can ill afford.

SUMMARY OF THE INVENTION

The present invention provides for shared, and even simultaneous use of bit fields of a microinstruction for effecting control and operation over component parts of a microprocessor system. Such shared, multiple and simultaneous use of control signals provide the capability of overlapping operations in order to perform in one microinstruction what would ordinarily take two microinstructions.

According to the present invention, there is provided a temporary storage element having input circuits that are coupled to a number of the interconnecting signal lines between the ROM and ALU of the microprocessor system. The storage element is used to temporarily hold control bits of the microinstruction, normally used for ALU operation, so that the stored bits can be again utilized for yet other microprocessor functions.

In the preferred embodiment, the present invention is used to share microinstruction bit fields to control register selection of an ALU and to specify a subsequent microinstruction address. The microprocessor with which the invention is used incorporates a ROM containing a number of microinstructions, a controller unit for forming microinstruction addresses, and an ALU that includes a number of data registers. Control lines interconnect the ROM and ALU for effecting selection of which data register of the ALU is to be the source or destination of a data operation performed. The storage element is coupled to the register control lines and is responsive to a predetermined state of a microinstruction bit to store signals conducted on the register control lines. A second bit of the microinstruction is used to effect transfer of the stored signals from the storage element to the controller unit to specify a new microinstruction address that is applied to the ROM.

A microprocessor system structured and designed in accordance with the teachings of the present invention provides several advantages. Heretofore, bit-fields of a microinstruction have been reserved specifically for the purpose of containing subsequent microinstruction addresses. This increased the bit count of each microinstruction and the required microinstruction memory space. Using the bit field of a microinstruction that specifies ALU data register selection to also specify a new microinstruction address reduces the number of required bits used to form each microinstruction. In turn, the size of the microinstruction memory is also reduced.

Further, by sharing the signals used to specify the ALU data registers provides the microprocessor with the capability of performing two operations simultaneously: An ALU data register can be selected at the same time a new microinstruction address is transferred to the storage element.

These and other advantages will become more apparent upon a review of the following detailed description taken in conjunction with the drawings.

BRIEF DESCRIPTION OF THE DRAWINGS

FIG. 1 is a simplified block diagram of a microprocessor incorporating the present invention.

DETAILED DESCRIPTION OF THE INVENTION

Illustrated in FIG. 1, a microprocessor, designated generally by the reference numeral 10, forms the microprogramming of a larger data processing unit such as, for example, a mini-computer. Such a data processor unit would have a host computer generally designated at 12 (and drawn in phantom), for effecting overall control of the data processor functions. Machine commands, in the form of address signals, and conducted on a multi-line address bus 13 (accompanied by a read/write (R/W) signal on line 11), and data is communicated on bi-directional data bus 14. Each machine command is performed by the microprocessor 10 by executing several microinstructions in sequence.

In order to perform the operations required by each machine command, the microprocessor 10 includes an arithmetic logic unit (ALU) 16 and a microprogram memory 18 which contains a plurality of microinstructions used to control overall operation of the microprocessor 10. The microinstructions are sequentially accessed from the microprogram memory in response to address signals produced by a controller 20, which are conducted to the microprogram memory 18 via address lines 22.

Timing for the microprocessor 10 is supplied by a clock signal that is generated by a timing circuit (not shown) that resides in the host computer 12 and conducted to the microprocessor 10 via a clock line 15. The clock line conducts the clock signal to the respective clock (CK) inputs of the ALU 16 and controller 20.

Although not specifically illustrated, the ALU 16 typically includes a number of data registers used to temporarily hold data that is being operated on by the ALU in response to accessed microinstructions. See, for example, the brochure entitled "Signetics Bipolar Microprocessor Central Processing Element N2901-1" published June, 1977, by Signetics Corporation, 811 East Arquez Avenue, Sunnyvale, Cal. 94086.

In order to effect register selection as the source or destination of data being operated on by the ALU 16, as well as effective overall control of the ALU, predetermined bit fields of each accessed microinstruction are communicated to the ALU 16 from the microprogram memory 18 via a plurality of signal lines: Four (4) register signal lines 30 conduct a four-bit microinstruction field (A) from the microprogram memory 18 to effect selection of one of the registers as the source of one operand for a selected data manipulation; four (4) register select signal lines 32 conduct another four-bit microinstruction field (B) to the ALU 16 to effect selection of another of the internal registers of the ALU 16 as the source of the other operand and possibly the destination of the result of the data manipulation. In addition, nine (9) signal lines 34 conduct an nine-bit microinstruction field (I) to the ALU 16 to, for example, determine what data sources will be applied to the ALU, what function the ALU will perform, and what data is to be deposited in the internal registers.

The microprocessor 10 also includes an 8-bit jump latch 40 having inputs 42 and 44 to which the register select signal lines 30 and 32, respectively, are conducted. Eight output lines 46 conduct the content of the jump latch 40 to the controller 20.

In addition to the 4-bit microinstruction fields A and B and the 9-bit field I, there are also 1-bit microinstruction fields used: A 1-bit microinstruction (LD) field is conducted from the microprogram memory 18 by a signal line 50 to the enable (EN) input of the jump latch 40; and a 1-bit microinstruction field (JMP) is conducted to the jump (J) input of the controller 20 from the microprogram memory 18 by a signal line 54. Other control fields of the microinstruction are used but not shown here because they are not germane to the present invention.

Address/command signals, calling the microprocessor 10 into operation are transmitted by the host processor 12 to the microprocessor on the address bus 13. These address/command signals are received at the microprocessor 10 by a decoder and mapping PROM 60. Simultaneous therewith, an R/W signal is conducted from the host computer 12 on the signal line 11, which is also received by the decoder and mapping PROM 60 (as well as other components-not shown-of the processor system), including that the address/command information then appearing on the address bus 13 is presently valid. The information is received and decoded by the decoder and mapping PROM 60 and, if recognized as pertaining to the microprocessor 10, the decoder and mapping PROM 60 will issue a microinstruction address on the signal lines 62, accompanied by START signal on line 64. The microinstruction address and START signal issued are applied to the controller 20, causing the microinstruction address to be received by a binary counter (not shown) contained in the controller to form the address that applied to the microprogram memory 18. The selected microprogram memory location designated by the address appears at the data outputs of the microprogram memory, contains the first of a sequential series of microinstructions used to perform the operation designated by the particular address/command signals received from the host processor 12. In response to the START signal, the binary counter in the controller 20 beings counting the clock signal received at the CK input of the controller to generate sequentially ordered address signals that are conducted to the microprogram memory 18 via the signal lines 22. In turn, the microprogram memory 18 issues the microinstructions stored at the memory locations addressed by the signals communicated from the controller.

As each microinstruction appears at the outputs of the microprogram memory 18, including the A, B and I fields, the bit structure directs each step the microprocessor takes. For example, data from the host processor 10 may need to be received and temporarily stored in the internal registers of the ALU 16 for later use. Or, the content of the ALU 16 internal registers, specified by the microinstruction, may be designated at the operand of an arithmetic function performed by the ALU. These operative steps are effected with the accessing of each microinstruction by communicating the respective bit fields to the microprocessor component they are meant to control—here, for example, the ALU 16. However, other components of the system can, through the use of the present invention, use certain of the same microinstruction bit fields to perform still further operations. This is the function of the jump latch 40.

The jump latch 40 provides the microprocessor 10 with the capability of specifying the address of a subsequent microinstruction or sequence of microinstructions. This is performed in the following manner: In response to an address conducted on signal lines 22, the microprogram memory will issue a microinstruction whose A and B fields designate the memory location of the desired subsequent microinstruction and whose LD bit field is set to a predetermined state. The LD bit of the microinstruction is conducted to the EN input of the jump latch 40, causing the latch to temporarily store A and B bit fields of the microinstruction then appearing on signal lines 30 and 32. That same microinstruction, or a subsequent microinstruction, would then have its JMP bit field set to a state that, when conducted to the controller 20 via the signal line 54, causes the content of the jump latch 40 to be transferred to the binary counter (not shown) of the controller 20. The transferred content of the jump latch 40 becomes the address that is supplied to the microprogram memory 18 via the signal lines 22, addressing the memory location of the "jumped to" microinstruction.

In summary, therefore, the present invention provides for performing a specified operation (i.e., selecting the address of a subsequent microinstruction) without the requirement of designating predetermined bit fields of the microinstruction solely for this purpose. Rather, the present invention utilizes bit fields (i.e., the A and B fields also used to select internal registers of the ALU 16) to specify a microinstruction address. Thereby, memory space is conserved and the microprogram memory size kept acceptable.

It should be evident, in light of the above description, that the present invention can be used not only to share bit fields of a microinstruction, but to simultaneously use the same bit fields. For example, the bit structure of the A and B fields of a microinstruction can (1) specify an internal A and/or B register of the ALU 16 and, at the same time (2) specify microinstruction address. The simultaneous use of the A and B fields of a microinstruction is simplified somewhat by the fact that at times only the A or the B fields are used (in conjunction with the I field, specifying an operation) to effect register selection within the ALU 16. The unused field is ignored by the ALU 16.

At other times, both the A and B fields are ignored by the ALU 16; only the I field of the microinstruction is used to specify an arithmetic or logic operation that does not incorporate any of the internal A or B registers.

While the above provides a full and complete disclosure of the preferred embodiment of the invention, various modifications, alternate constructions and equivalents may be employed without departing from the true spirit and scope of the invention. For example, it is typical to include circuitry in microprocessor 10 that looks at the most significant bit and the overflow outputs of the ALU 16 to determine the sign of an arithmetic operation or whether the operation caused an overflow. These conditions of arithmetic operations can be used to partially control whether or not the jump latch 40 is to be loaded or whether the content of the jump latch 40 is to be transmitted to the controller 20 to form a new microinstruction address.

Therefore, the above description and illustration should not be construed as limiting the scope of the invention, which is defined by the appended claims.

I claim:

1. A circuit for sharing a microinstruction bit field to control register selection of an arithmetic logic unit and to specify a jump address, the circuit comprising:

a memory element containing a plurality of addressable microinstructions, the microinstructions being addressed in response to address signals, the addressable microinstructions including a first field, a second field, a jump field, and a load field, at least one of the addressable microinstructions containing data in the load field corresponding to a load instruction and data in the jump field corresponding to a jump instruction, the first field selecting a data register for an arithmetic operation and containing a jump address simultaneously;

an arithmetic logic unit coupled to the memory element to receive the data in the first and second fields of the addressable microinstructions, the arithmetic logic unit having a plurality of selectable data registers, the arithmetic logic unit selecting a data register in response to data in the first field of the one addressed microinstruction, the arithmetic logic unit for performing an arithmetic operation on the data contained in the selected register, the operation selected in response to data in the second field of the one addressed microinstruction;

a storage element coupled to the memory element to receive the data in the first and the load fields of the addressable microinstructions and to store data contained in the first field in response to the data in the load field corresponding to a load instruction; and an address circuit coupled to the memory element and to the storage element for receiving stored data from the storage element and the data in the jump field of the addressable microinstructions, the address circuit providing address signals to the memory element, the address signals provided in a sequence in response to the absence of data in the jump field corresponding to a jump instruction, address signals corresponding to the received stored data in response to the data in the jump field corresponding to a jump instruction.

2. The device of claim 1 wherein the memory element is a read only memory (ROM).

3. The device of claim 1 wherein the storage element is a latch.

4. The device of claim 1 wherein the address circuit comprises a counting circuit.

5. The device of claim 1 wherein a first microinstruction contains a load instruction and a subsequent microinstruction contains a jump instruction and no load instruction, wherein the second microinstruction executes a jump to an address defined by the first microinstruction.

6. A circuit for sharing a microinstruction bit field to control register selection of an arithmetic logic unit and to specify a jump address, the circuit comprising:

a memory element containing a plurality of addressable microinstructions, the microinstructions being addressed in response to address signals, the addressable microinstructions including a first field, a second field, a jump field, and a load field, at least one of the addressable microinstructions containing data in the load field corresponding to a load instruction, the first field selecting a data register for an arithmetic operation and containing a jump address simultaneously, a second addressable microinstruction containing data in the jump field corresponding to a jump instruction;

an arithmetic logic unit coupled to the memory element to receive the data in the first and second fields of the addressable microinstructions, the arithmetic logic unit having a plurality of selectable data registers, the arithmetic logic unit selecting a data register in response to data in the first field of the one addressed microinstruction, the arithmetic logic unit for performing an arithmetic operation on the data contained in the selected register, the operation selected in response to data in the second field of the one addressed microinstruction;

a storage element coupled to the memory element to receive the data in the first and the load fields of the addressable microinstructions and to store data contained in the first field in response to the data in the load field corresponding to a load instruction; and an address circuit coupled to the memory element and to the storage element for receiving stored data from the storage element and the data in the jump field of the addressable microinstructions, the address circuit providing address signals to the memory element, the address signals provided in a sequence in response to the absence of data in the jump field corresponding to a jump instruction, address signals corresponding to the received stored data in response to the data in the jump field corresponding to a jump instruction.

* * * * *